Aug. 16, 1938.  G. VENOSTA  2,127,075

COMPOSITE PNEUMATIC TIRE

Filed June 15, 1935  4 Sheets-Sheet 1

Inventor:-
Giuseppe Venosta,
By: Smith, Michael & Gardiner, Attorney

Aug. 16, 1938.  G. VENOSTA  2,127,075
COMPOSITE PNEUMATIC TIRE
Filed June 15, 1935  4 Sheets-Sheet 2
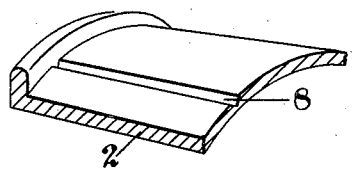
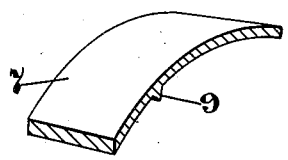
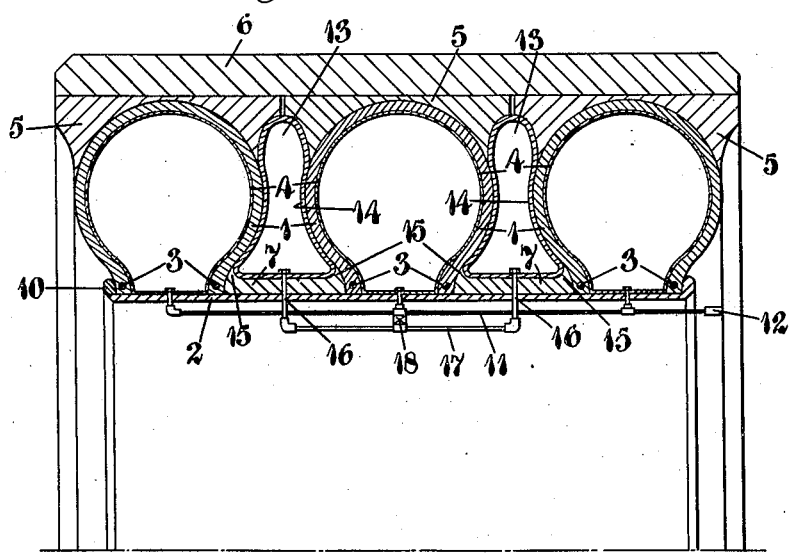

Aug. 16, 1938.  G. VENOSTA  2,127,075
COMPOSITE PNEUMATIC TIRE
Filed June 15, 1935  4 Sheets-Sheet 3

Inventor:—
Giuseppe Venosta,
By:- Smith, Michael & Gardiner, Attys.

Aug. 16, 1938.         G. VENOSTA         2,127,075
COMPOSITE PNEUMATIC TIRE
Filed June 15, 1935         4 Sheets-Sheet 4

Inventor
Giuseppe Venosta,
By: Smith, Michael & Gardiner, Atty.

Patented Aug. 16, 1938

2,127,075

UNITED STATES PATENT OFFICE 2,127,075

COMPOSITE PNEUMATIC TIRE

Giuseppe Venosta, Milan, Italy, assignor to Societa Italiana Pirelli, Milan, Italy, an Italian company Application June 15, 1935, Serial No. 26,831
In Italy June 19, 1934

7 Claims. (Cl. 152—342).

This invention relates to pneumatic vehicle wheel tires having an axially elongated cross-section or in other words a relatively small difference between maximum and minimum diameter, that is to say across respectively the tread surface and the beads. The invention is specially concerned with providing a tire of this description which can be produced with a very wide section, that is to say with a long axial length relatively to maximum and minimum diameter difference.

Heretofore, as is known, the practice in increasing the cross-sectional area of a pneumatic tire has been to provide the increase by increasing the said difference between maximum and minimum diameter. This increase of the diameter difference, however, has correspondingly increased certain problems both to the tire manufacturer and also to the motor car and chassis builder, and with a view to eliminating the practical difficulties from this cause it has been attempted to produce large sized tires in flat or axially elongated cross-sectional form by the use of inextensible tread foundations. This attempt, however, has not proved a success owing to practical difficulties in its way.

The object of the present invention is to provide an improved construction of tire of axially elongated cross-sectional form wherein these difficulties are obviated and whereby, moreover, a tire of enhanced efficiency is produced.

According to the invention, a pneumatic vehicle wheel tire of axially elongated cross-sectional form comprises in combination and in the form of an integral unitary structure, a plurality of beaded pneumatic tire cover carcases of conventional form and construction disposed co-axially side by side with an air space intervening between them and completely separating them for substantially the full radial depth of the carcasses, whereby the latter are left completely free for independent lateral movement relatively to one another, replete each with inextensible beads, arranged each to be inflated by means of an inflatable inner tube inserted within the carcase and constituting each a load supporting element in the tire; a single tread extending collectively over the several carcases axially thereof; and separate annular rubber sockets for the respective carcases intervening between the latter and the tread, integrally and permanently united to both directly and extending each part-way down the wall of the corresponding carcase on each side thereof so as to afford lateral support thereto from the inner side of the tread.

It will be understood, of course, that the annular sockets referred to for the carcases will be composed of rubber of suitable hardness and resilience for the purposes of the invention and in connection with the independent pneumatic tire cover carcases, it may be remarked that it is an advantage that in producing the pneumatic part of the tire, that is to say these carcases, replete each with their inextensible beads and adapted each to receive within it an inflatable inner tube exactly as in the conventional pneumatic tire, factory equipment already existing and serving for the manufacture of the conventional tire may be employed, with realization thus of considerable technical and economic advantages as compared with known methods of manufacture of tires of axially elongated cross-sectional form. It may further be remarked in this connection that the inclusion of annular sockets for the carcases, constituting the intermediary between the carcases and the tread and serving, as described, not only as an intermediary of connection between the carcases and the tread but also as a means for the affording of lateral support to the walls of the carcase is associated in the invention with the use of the conventional tire cover carcase, for with such a carcase the walls, as is known, are characteristically relatively thin and flexible.

Preferably the width of the tread is at least substantially equal to the overall length of the tire section along the diameters of the carcases.

It is also preferred that the bead diameter shall be the same in respect of each carcase, the tire being thereby telescopable into position upon a tubular wheel rim by rectilinear endwise movement relatively thereto, the external diameter of the wheel rim corresponding accordingly with the bead diameter of the carcases.

The number of carcases incorporated in the tire may be any number of two or more according, as will be appreciated, to the axial length of the tire section in relation to its radial width or in other words to the difference aforesaid between the maximum and minimum diameters of the tire.

In this connection, it will be realized that as the improved construction of tire in accordance with this invention imposes no practical limit upon the axial length of the tire section for a given radial width thereof, tires in accordance with the invention may be produced of practically any desired axial length in relation to radial width, to suit even the most exceptional cases of limited wheel space height in the vehicle chassis with which the tires are to be used. The invention, therefore, is specially advantageous in cases of tires for use upon vehicles wherein, as in industrial trucks, for instance, the available wheel space height is characteristically limited while the space axially of the wheel is unrestricted.

As will be understood, intervening air cavities exist between adjacent carcases in the improved tire in accordance with this invention, these cavities being bridged by the tread of the tire, and according to a feature of the invention, the said cavities (or cavity, in the case of a tire comprising only two carcases) may also be inflatable, that is to say in addition to the carcases on either side of them. Thus, it is found that by inflating these cavities to a suitable pressure not in excess of and preferably lower than the pressure obtaining in the carcases, the pressure on the tread of the tire is distributed more uniformly. It is important that, as stated, the pressure in the cavities shall not exceed that obtaining in the carcases, as otherwise the carcases would lose their normal convex shape in cross-section and the tire would in consequence defeat its purpose.

The cavities may be inflatable either directly or as in the case of the carcases indirectly through the intermediary of an inflatable inner tube suitably shaped to conform when inflated to the cross-section of the cavity. In the former event, air-tightness of the cavity, at the joints between the edges of the spacers and the beads of the carcases, would be ensured in known manner by the use of gaskets.

The cavities may be reinforced if necessary, according for example to the working air pressure, the shape of the cavity or the thickness of the tread, by the incorporation in the wall of additional carcases of rubberized fabric.

In cases where the cavities aforesaid are arranged to be inflated, the several cavities are preferably inflatable simultaneously from a common air pipe controlled by a single valve, and a convenient arrangement in this respect is one in which this air pipe is common also to the inner tubes in the carcases; in which event, in cases where the working pressure to obtain within the cavities is less than that to obtain in the inner tubes, a reducing valve may be interposed between the air pipe and the cavities, the said reducing valve being suitably calibrated to provide the difference of working pressure required.

The tread profile of the tire, that is to say across the section of the latter, may either be flat or slightly curved.

The said profile may however be adapted to the particular loading conditions of the vehicle with which the tires are to be used, having regard to the particular profile of the surface of the roads upon which the vehicle will mainly travel. Thus, it has been found that when the vehicle is unloaded, the spring is more satisfactory if the tread of the tire corresponds to a part only of that necessary when the vehicle is fully loaded. Also, when the vehicle has to travel along cambered roads, the tread of the tire rests better on the road if it is inclined with respect to the axis of the wheel at an angle corresponding to the camber of the road surface.

More specifically, the tread profile of the improved tire is of such predetermined form that when the vehicle with which the tire is to be used is unloaded a part only of the profile is in contact with the road but when the vehicle is fully loaded the whole of the profile contacts with the road; that is to say having respect to the particular characteristic profile, cambered or non-cambered, of the road along which mainly the vehicle will travel. By this means, undesirable secondary stresses in the tire and uneven wear of the tire are avoided.

Thus, the tread of the tire may be of curved or polygonal profile or it may have a flat profile inclined to the axis of the tire, or again a profile which is both curved or polygonal and also of general inclination to the axis of the tire.

The foregoing special profiling of the tread of the tire may be provided for either by correspondingly varying the size of the respective carcases of the tire (that is to say by so dimensioning the carcases and the cavities between them that the line circumscribing them across the section of the tire and tangential to them conforms to the profile to be given to the tire) or by varying the thickness of the tread, the carcases in this latter event being all of the same size, or by a combination of these methods.

The tread of the tire, whether specially profiled or not, may be provided with one or more circumferential continuous or discontinuous grooves or furrows coincident in the plane of the tire with the cavity or cavities aforesaid between the carcases. It may be sculptured in any design.

The invention will now be further described with reference to the accompanying drawings which illustrate several embodiments by way of example. In these drawings, Figure 1 is an axial section through a tire in accordance with the invention incorporating three independent carcases;

Figs. 3 and 3a are respectively fragmentary views in perspective, Fig. 3 showing one of the locating guide grooves aforesaid in the periphery of the wheel rim and Fig. 3a showing the corresponding tongue which cooperates therewith on the radially inner surface of the spacer;

Figure 4 is an axial section similar to Figure 1, but illustrating the modification of the invention according to which the cavities intervening between the carcases of the tire are inflatable;

Figure 1:
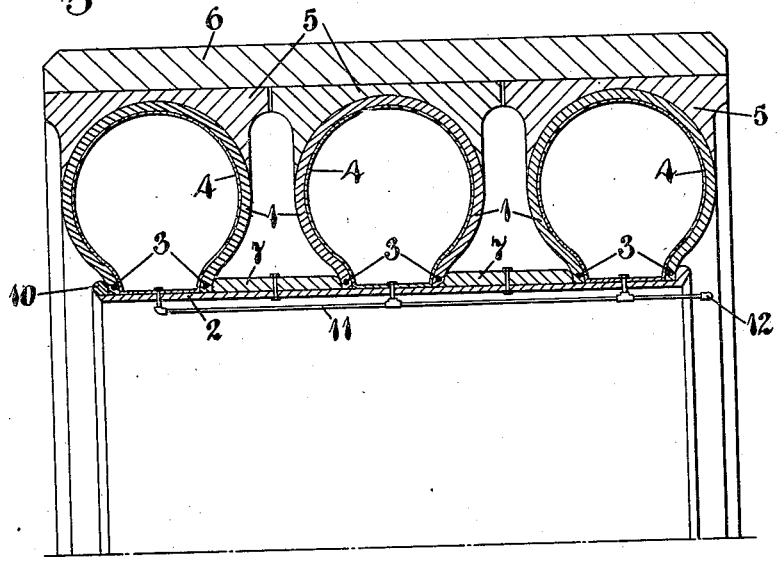
Figure 5:
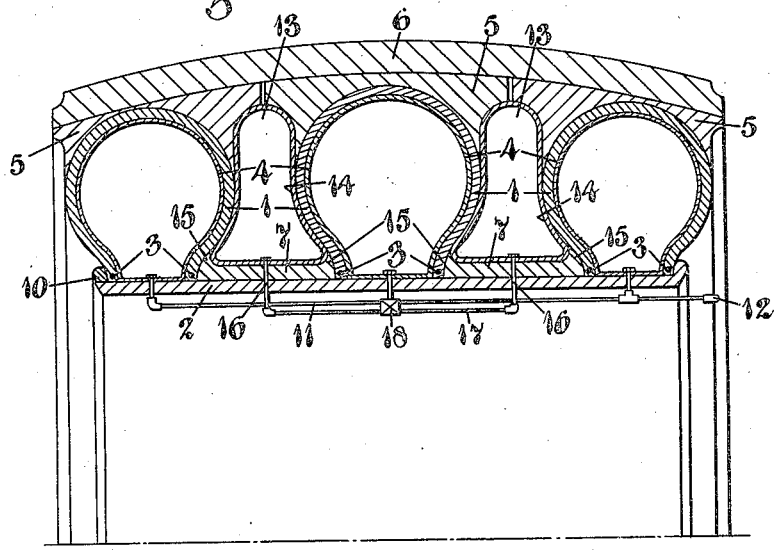
Figure 5 is a similar section again illustrating this modification of the invention in conjunction with the further modification according to which the tread profile of the tire is of curved form to adapt the tire to the loading conditions of the vehicle with which the tire is to be used.
Figure 6:
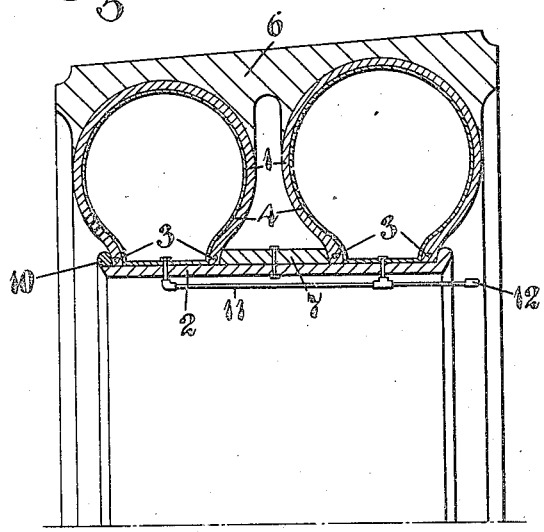
Figure 6 is an axial section similar to Figure 2 but showing a tire with a tread profile inclined to the axis of the tire.
Figure 7:
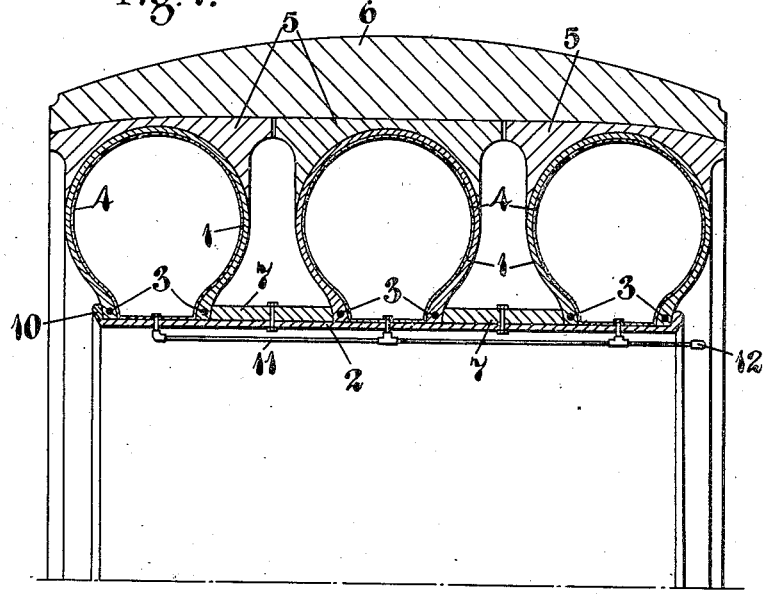
Figure 8:
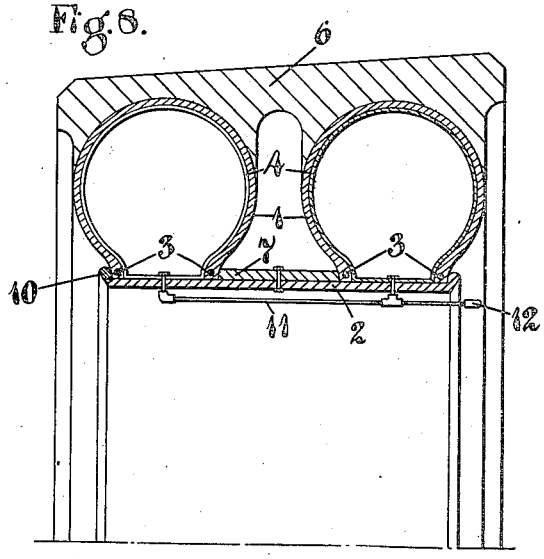

Figure 7 is an axial section similar to Figure 1 but showing a tire with a tread profile of curved form as in Figure 5, and Figure 8 is an axial section similar to Figure 6, but illustrating the case where the inclination of the tread profile to the axis of the wheel is obtained by employing a tread of tapering thickness in contrast to the use for this purpose as in Figure 6, of carcases of different size.

Like reference numerals indicate like parts in the various figures of the drawings.

Referring first to Figure 1, the tire shown in this figure comprises three pneumatic tire carcases 1 of known type and construction. These carcases are mounted side by side upon a wide flat section wheel rim 2. Each carcase is formed with inextensible beads 3 as in the case of the conventional tire. Within each carcase is an inflatable inner tube 4. 5 are foundation bands intervening between the respective carcases 1 and a common tread 6.

The adjacent beads of adjoining carcases are held in position upon the rim 2 by means of annular spacers 7. These spacers consist of metallic rings having an inside diameter slightly greater than the outside diameter of the rim. As previously stated herein, they may either be in end-to-end sections or in the form of a split ring.

The wheel rim 2 is wide enough as shown to embrace all three of the carcases providing seats therefor between the spacers 7, and as shown in Figures 3 and 3a, the rim is formed with a series of locating guide grooves 8 for the purpose hereinbefore referred to, co-operating with corresponding tongues 9 on the radially inner surface of the spacers.

In the manufacture of the tire a convenient mode of operation is as follows:—The three carcases 1 are prepared and provided with the respective foundation bands 5, following the usual methods of tire building. These carcases and bands are then vulcanized at least partially in suitable moulds. At the same time, the tread 6 is prepared separately and vulcanized to the same extent as the carcases. The various parts are then assembled by superimposing the tread upon the carcases, the latter in their respective positions side by side and the foundation bands 5 having been skived and spread with rubber to enhance the bond as between the bands and the tread 6. This bond is provided either by the use of a self-curing cement, if the various parts to be assembled are already completely vulcanized, or by a further vulcanization of the assembly in a mould or under a bandage, if previously a partial vulcanization of the constituent parts has been effected.

Upon completion of these operations, the tire is mounted upon the rim 2. For this purpose, the inner tubes 4 are first inserted into position in the respective carcases, if necessary in a slightly inflated condition. The spacers 7 are then introduced into position between the adjacent beads of adjoining carcases, the tongues 9 on the spacers registering with one another, those of one spacer with those of the other. A demountable flange 10 on one end of the wheel rim is then removed, after which the assembly of tire, tubes and spacers is telescoped into position upon the rim. The inner tubes 4 are then connected up to an inflating air pipe 11 common to all of the tubes and controlled by a single valve 12, the spacers 7 are fixed in position to the wheel rim and finally the tubes are inflated to the required working pressure.

Figure 2:
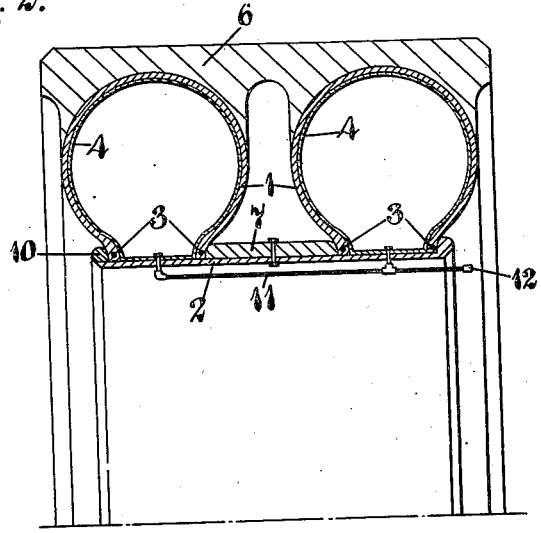
Figure 2 is a similar section of a two-carcase tire.

Referring next to Figure 2, the tire shown in this figure comprises two carcases 1, and the construction and method of production of the tire is generally similar to that described with reference to Figure 1, the principal exception being that whereas in the tire of that figure there is a separate tread 6, in the construction shown in Figure 2, the tread is formed integrally with the part equivalent to the foundation bands 5 of the other construction.

Referring next to Figure 4, in the cavities 13 between the carcases 1 are inner tubes 14 similar to the tubes 4 but of a cross-section to conform to the section of the cavity. The spacers 7 have marginal ribs 15 of curved sectional contour to conform to the curvature of the beads 3 of the carcases and in the centre of the spacers are holes through which reach branch conduits 16 from an inflating air pipe 17 common to the two cavities and communicating with a second air pipe 11 by way of a pressure reducing valve 18, this second air pipe 11 being connected in common as shown, to the three inner tubes 1 and being controlled by a single valve 12 as described with reference to Figure 1. The pressure reducing valve 18 is calibrated to give a predetermined pressure difference between the working air pressure in the carcase tubes 1 and that in the cavity tubes 14.

Referring next to Figure 5, the two outer carcases have the same diameter. The centre carcase is of larger diameter and the profiles of the assembled foundation bands 5 on the respective carcases form together a curved line on which the tread 6 rests. The rise of the tread arch is 0.05 (in the drawings the rise is greater to illustrate the construction of the invention more clearly). In each of the cavities between the carcases, specially shaped inflating tubes 14 are provided as in the construction of Figure 4 and again as in that construction these tubes are inflated through a common air pipe 11 by way of a pressure reducing valve 18.

In the construction illustrated in Figure 6, the two carcases 1 have different diameters and, as previously remarked, the tread 6 is formed integrally with the equivalent in this construction of the foundation bands 5 of the previous constructions, the said tread 6 extending continuously in as shown to the surface of the carcases. In this case, the tread has an inclination to the axis of the tire of 0.02 (exaggerated as before in the drawings) and the tire can, if desired, be vulcanized directly in one piece by introducing a collapsible core in the cavity between the carcases.

Referring to Figure 7, the three carcases in the construction of this figure are all of the same diameter, and the curvature of the tread profile is obtained by using a tread band of varying thickness, being thicker at the centre than at the sides. As shown in the figure, the outermost surface of the foundation bands 5 is substantially flat across the section of the tire and the section of the tread band is plano-convex.

Referring finally to Figure 8, here again the carcases are of the same diameter and the tread band, extending continuously, as in the construction of Figure 6, to the surface of the carcases 1 has a section with a frusto-conical outer profile inclined to the axis of the tire.

It will be evident to the expert in the art that the invention is susceptible to considerable modification as regards details of construction of the improved tire. For instance, the number and size of the inflatable portions of the tire and the curvature and inclination of the tread surface may vary widely as desired or according to the practical requirements of the tire. The various caracses also may, if desired, be of different construction, for example in the case where there are at least three carcases, those which are subjected to lower stresses may be of less robust construction than the others. Also, the working pressures may be different in the various tubes, for instance, lower in those nearest the centre or medial plane of the tire than in those further from the centre.

What I claim and desire to secure by Letters Patent of the United States is:—

1. A composite pneumatic vehicle wheel tire of axially elongated cross-sectional form comprising in combination a plurality of beaded pneumatic tire cover carcases disposed coaxially side by side with an air space intervening between them and completely separating them for substantially the full radial depth of the carcases, whereby the latter are left completely free for independent lateral movement relatively to one another, replete each with inextensible beads, arranged each to be inflated by means of an inflatable inner tube inserted within the carcase and constituting each a load supporting element in the tire; a single tread extending collectively over the several carcases axially thereof; and annular rubber sockets carried upon the tread at the radial innermost side thereof and embracing the carcases over substantially the radial outer half of the external surface of each carcase so as to extend part way down the side walls of the carcases from the radial innermost side of the tread, thereby affording lateral support to the carcases and distributing therein the forces which during the use of the tire are conveyed to the carcases from the tread, said sockets being permanently bonded to said carcases and being spaced from one another axially of the tire so as to provide between each pair of adjacent sockets the said air space which intervenes between the carcases and completely separates said carcases for substantially their full radial depth.

2. A composite pneumatic vehicle wheel tire of axially elongated cross-sectional form comprising in combination, a plurality of beaded pneumatic tire cover carcases disposed coaxially side by side with an air space intervening between them and completely separating them for substantially the full radial depth of the carcasses, whereby the latter are left completely free for independent lateral movement relatively to one another, replete each with inextensible beads, arranged each to be inflated by means of an inflatable inner tube inserted within the carcase and constituting each a load supporting element in the tire; a single tread extending collectively over the several carcases axially thereof and of width at least substantially equal to the overall length of the tire section along the diameters of the carcases; and annular rubber sockets carried upon the tread at the radial innermost side thereof and embracing the carcases over substantially the radial outer half of the external surface of each carcase so as to extend part way down the side walls of the carcases from the radial innermost side of the tread, thereby affording lateral support to the carcases and distributing therein the forces which during the use of the tire are conveyed to the carcases from the tread, said sockets being permanently bonded to said carcases and being spaced from one another axially of the tire so as to provide between each pair of adjacent sockets the said air space which intervenes between the carcases and completely separates said carcases for substantially their full radial depth.

3. A composite pneumatic vehicle wheel tire as specified in claim 1, wherein the intervening air spaces between adjacent carcases themselves constitute inflatable air tubes.

4. A composite pneumatic vehicle tire as specified in claim 1, wherein the intervening air spaces between adjacent carcases themselves constitute inflatable air tubes and wherein means are provided for inflating the inner tubes within the carcases and for inflating the said air tubes, said means permitting inflation of said air tubes at a working pressure which is lower than the pressure of inflation of the inner tubes within the carcases.

5. A composite pneumatic vehicle tire as specified in claim 1, wherein a separate inflatable inner tube is positioned within each of the spaces intervening between adjacent carcases of the tire, and wherein means are provided for inflating the inner tubes within said carcases and the inner tubes within each of the spaces intervening between adjacent carcases, said means permitting inflation of the inner tubes within each of the spaces intervening between adjacent carcases at a working pressure which is lower than the pressure of inflation of the inner tubes within the carcases.

6. A composite pneumatic vehicle wheel tire as specified in claim 1, wherein the air spaces between adjacent carcases themselves constitute inflatable air tubes and the inner tubes in the carcases together with the said air spaces are arranged to be inflated from a single air pipe common to them all and controlled by a single valve, the air spaces being inflatable to a lower working pressure than the inner tubes in the carcases and a pressure reducing valve being introduced for this purpose between the said air pipe and the air spaces, suitably calibrated to provide the required pressure difference.

7. A composite pneumatic vehicle wheel tire as specified in claim 1, comprising inflatable inner tubes in the intervening air spaces between adjacent carcases of the tire, for the inflation of these spaces, the said tubes being shaped to conform when inflated to the cross-section of the air space.

GIUSEPPE VENOSTA.